(12) United States Patent
Moshyedi

(10) Patent No.: US 11,790,342 B2
(45) Date of Patent: Oct. 17, 2023

(54) ESTABLISHING ONE-TO-MANY RELATIONSHIPS FOR EVENTS IN A RELATIONAL DATABASE

(71) Applicant: Capital One Services, LLC, McLean, VA (US)

(72) Inventor: Anne Moshyedi, Potomac, MD (US)

(73) Assignee: Capital One Services, LLC, McLean, VA (US)

( * ) Notice: Subject to any disclaimer, the term of this patent is extended or adjusted under 35 U.S.C. 154(b) by 20 days.

(21) Appl. No.: 17/348,214

(22) Filed: Jun. 15, 2021

(65) Prior Publication Data

US 2022/0398560 A1    Dec. 15, 2022

(51) Int. Cl.
  *G06Q 20/22*    (2012.01)
  *G06Q 20/02*    (2012.01)
  *G06Q 20/10*    (2012.01)

(52) U.S. Cl.
  CPC .......... *G06Q 20/227* (2013.01); *G06Q 20/02* (2013.01); *G06Q 20/102* (2013.01)

(58) Field of Classification Search
  CPC ..... G06Q 20/227; G06Q 20/02; G06Q 20/102
  See application file for complete search history.

(56) References Cited

U.S. PATENT DOCUMENTS 9,990,621 B1    6/2018 Ng et al.
10,074,082 B2    9/2018 Argue et al.
2017/0098217 A1*  4/2017 Studnitzer ............. G06Q 20/08
2018/0108011 A1*  4/2018 O'Regan ................ G06Q 20/36
2019/0385170 A1* 12/2019 Arrabothu .............. G06N 7/005
2020/0258072 A1    8/2020 Unnerstall et al.
2020/0334658 A1   10/2020 Aadi et al.

OTHER PUBLICATIONS

Brandon., "Recursive Database Structures," Journal of Computing Sciences in Colleges, Dec. 2005, vol. 21 (2), pp. 295-304, xp058167217, ISSN: 1937-4771.
International Search Report and Written Opinion for Application No. PCT/US2022/072382, dated Sep. 19, 2022, 11 pages.

* cited by examiner

*Primary Examiner* — Jessica Lemieux
*Assistant Examiner* — Merritt J Hasbrouck
(74) *Attorney, Agent, or Firm* — Harrity & Harrity, LLP

(57) ABSTRACT

In some implementations, a device may receive an indication of an event that is associated with a first account and an entity, and an amount associated with the event. The device may establish a record, in a relational database, to link an identifier associated with the first account with the event. The device may receive, from a device associated with the first account, a request to associate the event with the first account and a second account. The device may modify the record to link the identifier associated with the event with the identifier associated with the first account and an identifier associated with the second account. The device may update a first balance associated with the first account to reduce the first balance and update a second balance associated with the second account to increase the second balance based on modifying the record.

20 Claims, 8 Drawing Sheets

500

510 — Receive, via an input to a user interface, an indication to split an event with a second account, the indication to split the event including a unique identifier associated with the second account and a portion of an amount associated with the event to be associated with the second account, where the event is completed with an entity using a medium, the medium associated with the first account and an institution, and the second account is associated with the institution

520 — Transmit, to a server device associated with the institution, a request to split the event with the second account, the request indicating the unique identifier associated with the second account and the portion of the amount associated with the event to be associated with the second account

530 — Receive, from the server device, an indication of whether the request to split the event with the second account is approved

540 — Receive, from the server device, an indication of a balance associated with the account for display by the device, the balance indicating, a modified balance associated with the account based on an amount of the portion of the amount associated with the event to be associated with the second account if the request to split the event with the second account is approved, or an unmodified balance associated with the account if the request to split the event with the second account is not approved

FIG. 5

ESTABLISHING ONE-TO-MANY RELATIONSHIPS FOR EVENTS IN A RELATIONAL DATABASE

BACKGROUND

Data storage, such as a database, a table, and/or a linked list, among other examples, is an organized collection of data. A relational database is a collection of schemas, tables, queries, reports, and/or views, among other examples. Data storage designers typically organize the data storage to model aspects of reality in a way that supports processes requiring information. A data storage management system is a software application that interacts with users, other applications, and data storage to allow definition, creation, querying, update, and/or administration of data storage.

SUMMARY

In some implementations, a system for establishing one-to-many relationships for events to enable an event to be associated with multiple identifiers includes one or more memories and one or more processors, coupled to the one or more memories, configured to: receive, from a device associated with an entity, an indication of an event that is associated with a first account and the entity, wherein the indication of the event indicates an exchange amount associated with the event; generate, in a relational database, a record to link an identifier associated with the first account with the event; receive, from a device associated with the first account, a first request to generate a one-to-many relationship with the event and one or more other accounts, wherein the first request indicates a first portion of the exchange amount to be associated with the first account and a second portion of the exchange amount to be associated with the one or more other accounts; modify, in the relational database and based on a determination that the one-to-many relationship can be generated, the record to link the event with the identifier associated with the first account and an identifier associated with each of the one or more other accounts, wherein the record indicates the first portion of the exchange amount and the second portion of the exchange amount; and perform, based on the record in the relational database, one or more actions to complete the event, wherein the one or more actions include at least one of: performing, with the entity, a single exchange associated with the event based on the exchange amount; or receiving first resources associated with the first account based on the first portion of the exchange amount and second resources associated with the one or more other accounts based on the second portion of the exchange amount.

In some implementations, a method for splitting an event between a first account and a second account by establishing a one-to-many relationship in a relational database includes receiving, by a server device and from a device associated with an entity, an indication of the event that is associated with the first account and the entity, wherein the indication of the event indicates an exchange amount associated with the event; establishing, by the server device in a relational database, a record to link an identifier associated with the first account with the identifier associated with the event; receiving, by the server device and from a device associated with the first account, a first request to associate the event with the first account and the second account, wherein the first request indicates a first portion of the exchange amount to be associated with the first account and a second portion of the exchange amount to be associated with the second account; modifying, by the server device in the relational database and based on a determination that the request is granted, the record to link the identifier associated with the event with the identifier associated with the first account and an identifier associated with the second account, wherein the record indicates that the first account is associated with the first portion of the exchange amount and indicates that the second account is associated with the second portion of the exchange amount; updating, by the server device, a first balance associated with the first account to reduce the first balance based on modifying the record and a second balance associated with the second account to increase the second balance based on modifying the record; and performing, by the server device, an action to complete the event with the entity in a single exchange with the entity.

In some implementations, a non-transitory computer-readable medium storing a set of instructions includes one or more instructions that, when executed by one or more processors of a device associated with a first account, cause the device to: receive, via an input to a user interface of the device, an indication to split an event with a second account, wherein the indication to split the event includes a unique identifier associated with the second account and a portion of a first amount associated with the event to be associated with the second account, wherein the event is completed with an entity using a medium, the medium associated with the first account and an institution, and wherein the second account is associated with the institution; transmit, to a server device associated with the institution, a request to split the event with the second account, wherein the request indicates the unique identifier associated with the second account and the portion of the first amount associated with the event to be associated with the second account; receive, from the server device, an indication of whether the request to split the event with the second account is approved; and receive, from the server device, an indication of a balance associated with the account for display by the device, wherein the balance indicates: a modified balance associated with the account based on a second amount of the portion of the first amount associated with the event to be associated with the second account if the request to split the event with the second account is approved, or an unmodified balance associated with the account if the request to split the event with the second account is not approved.

BRIEF DESCRIPTION OF THE DRAWINGS

FIG. 5 is a flowchart of an example process relating to establishing one-to-many relationships for events in a relational database.

DETAILED DESCRIPTION

Figure 1A:
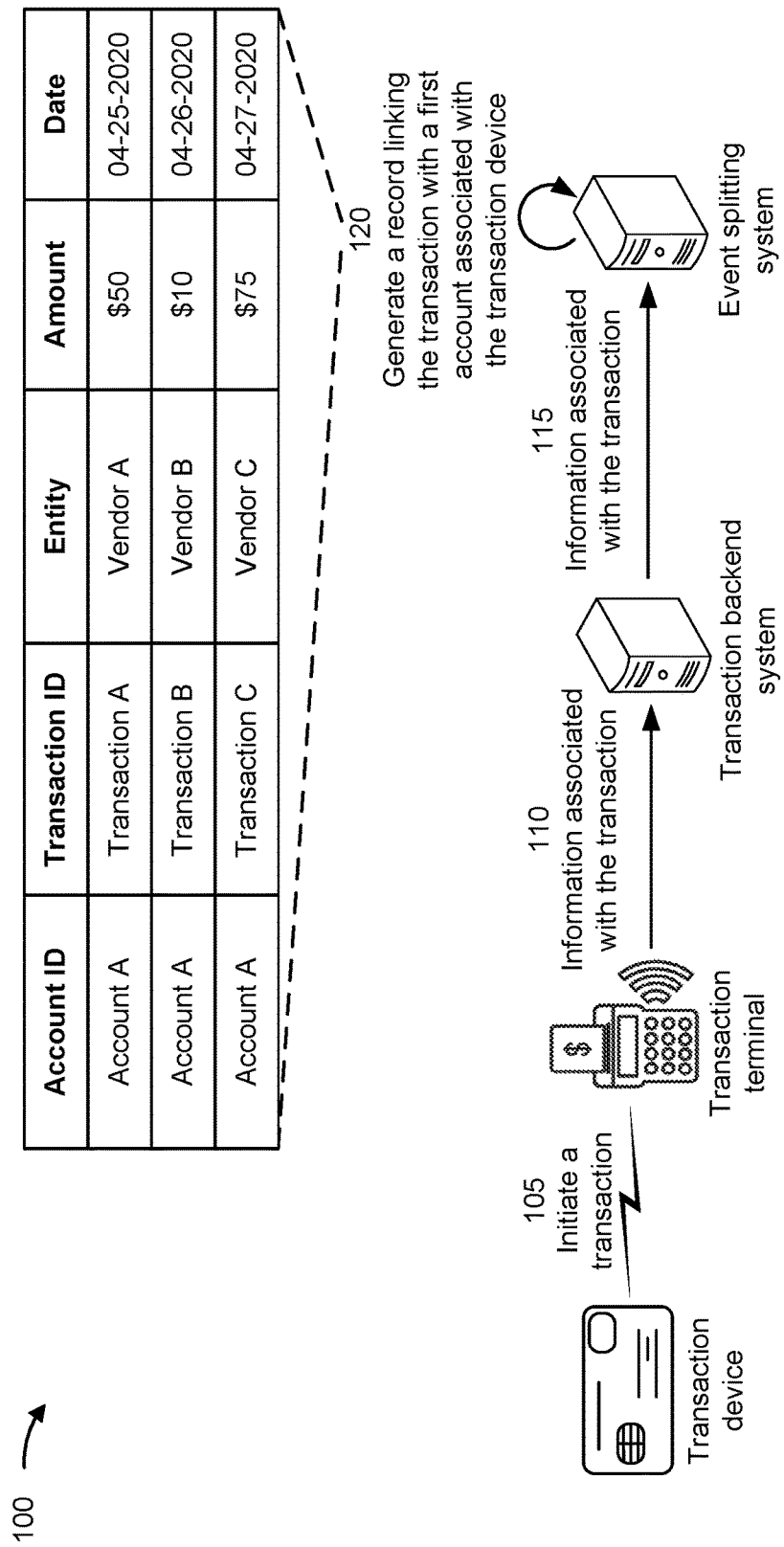
FIGS. 1A-1D are diagrams of an example implementation relating to establishing one-to-many relationships for events in a relational database.

The following detailed description of example implementations refers to the accompanying drawings. The same reference numbers in different drawings may identify the same or similar elements.

Transaction terminals may be used to complete payment transactions at various vendor locations. In some cases, a group of users may place an order. For example, the group of users may sit at a table and place an order for a meal at a restaurant. A vendor employee may access a transaction terminal to generate and print one bill or receipt for a total payment for order, which may be presented to the group of users placing the order. In some cases, the vendor employee may be asked to split the receipt among users in the group of users. In this case, the vendor employee must then manually split the receipt into multiple receipts based on instructions from the users. The vendor employee may then manually interface multiple payment mediums (e.g., multiple transaction cards, or a combination of transaction cards, a check, and/or cash) with the transaction terminal to satisfy the total payment for the order. Manually splitting the receipt into multiple receipts and manually processing multiple transaction cards is both time and labor intensive. Moreover, relying on the vendor employee to accurately split the receipt into the multiple receipts and process the multiple transaction cards may lead to errors. For example, a user may erroneously pay for an item that was not ordered by the user or a wrong transaction card may be processed for a wrong amount. Further, processing multiple transactions for the single order consumes time and resources associated with completing each transaction for the order (e.g., the transaction terminal must communicate with a backend server to request approval for each transaction associated with the order).

Additionally, an institution (e.g., a financial institution or another institution associated with payment accounts) that processes transactions may associate transactions with accounts in a one-to-one manner. That is, a single transaction may be associated with a single account (e.g., using unique identifiers in a relational database). For example, a backend server associated with the institution may receive a request to approve a transaction from a vendor. The request may indicate transaction information (e.g., an amount, a date, a time, a location, an identifier associated with the vendor, or similar information) and payment information (e.g., an account identifier, a transaction card identifier, or another identifier that identifies an account managed by the institution). The backend server may determine whether to approve the transaction based on the account identified by the request and the transaction information. If the backend server determines to approve the request, then the backend server may create an entry in a relational database to link an identifier of the account with an identifier of the transaction. The backend server may then charge the account based on the amount associated with the transaction. Additionally, the backend server may settle the transaction with the vendor by transferring resources to the vendor for the transaction.

As a transaction terminal may be capable of accepting only a single payment medium (e.g., a single transaction card) for a transaction, the request to approve the transaction from the vendor may identify only a single transaction card or a single account. Therefore, the backend server associated with the institution may be enabled to associate the transaction with only the single transaction card or the single account. To complete a transaction using multiple accounts, a user may be required to initiate multiple transactions at a transaction terminal (e.g., each transaction being initiated using different transaction cards or different payment mediums) to enable the transaction terminal to transmit separate requests to the backend server. This then enables the backend server to create multiple entries in a relational database linking the different transactions to different accounts. However, completing multiple transactions using multiple transaction cards or payment mediums consumes additional overhead associated with completing the multiple transactions. Moreover, completing multiple transactions using multiple transaction cards or payment mediums requires the backend server to settle multiple transactions with the vendor, creating additional complexity and additional overhead associated with settling the multiple transactions.

In some cases, the group of users may utilize a third party application or service to split the order (such as a payment application). For example, a single user from the group of users may present a payment medium (e.g., a transaction card, a check, or cash) to complete a single transaction for the order. The single user may then use the third party application or service to collect payments from the other users from the group of users to repay the single user for portions of the order. However, using the third party application or service requires that the single user coordinate with each of the other users after the single user has accepted a charge for the entire order. As a result, using the third party application or service is time and labor intensive as the single user may be required to determine a portion of the order to allocate to each other user, request a payment from each of the other users via the third party application or service, and wait for each of the other users to confirm the payment and transfer resources to the user via the third party application or service. Additionally, the user may be required to transfer resources from the third party application or service to an account that the user used to complete the transaction for the order. This consumes significant time and processing resources associated with requesting payments, receiving payments, and transferring the resources to another account. Moreover, in some cases, another user may deny or not complete the payment to the single user, resulting in the single user being responsible for the other user's portion of the order (e.g., as the single user has already paid for the entire order using resources associated with the user). Further, this requires a user to share sensitive information with the third party application or service, such as account information, an account number, and/or a routing number, among other examples. As a result, a security risk is introduced by the user sharing the sensitive information with the third party application or service.

In some cases, the group of users may utilize direct transfers to split a transaction or an order. For example, a first user may directly transfer resources to an account of the user that paid for the transaction or the order. However, this requires a user to share sensitive information with the other users, such as account information, an account number, and/or a routing number, among other examples. As a result, a security risk is introduced by the user sharing the sensitive information with the other users. Moreover, using a direct transfer or a third party application or service may add additional complexity associated with splitting a transaction. For example, a payment may be made using a direct transfer or using a third party application or server. However, it may be unclear what the purpose of the payment is (e.g., it may be unclear that the payment is associated with splitting a particular transaction). Therefore, additional steps or operations may need to be performed to identify the purpose of the payment.

Some implementations described herein enable establishing one-to-many relationships for events in a relational database. As used herein, "event" may refer to a record associated with an account, a transaction associated with an account, or an entry in a ledger associated with an account for which a device associated with an institution creates a one-to-one relationship between the event and an account (e.g., by linking an identifier of the event with an identifier of the account in a relational database). For example, some implementations described herein may enable a server device associated with an institution to create a one-to-many relationship for a transaction identifier. In other words, the server device may be enabled to link a single transaction identifier with multiple accounts. As described elsewhere herein, the institution may be an institution that manages or provides payment accounts, such as a bank or a credit card company, among other examples.

In some implementations, an event may be associated with an account. For example, a transaction identifier may be linked to an account identifier by the server device. A user associated with the account may identify that the transaction should be split with one or more other users. The user device may transmit, to the server device, a request to associate the transaction with one or more other users (e.g., with one or more other accounts). For example, the request may identify the one or more other users, may identify the one or more other accounts, and/or may identify a portion of the transaction that is to be associated with each account of the one or more other accounts, among other examples. The server device may determine whether the request can be granted (e.g., based on performing a fraud analysis and/or based on information associated with the one or more other accounts). If the server device determines that the request can be granted, then the server device may transmit, to a user device associated with the one or more other accounts, a request to approve the request to associate the transaction with the one or more other users. If the server device receives an indication that the request to associate the transaction with another user, of the one or more other users, is approved or permitted then the server device may create a one-to-many relationship to link the transaction identifier to the account identifier of the user (e.g., that was originally associated with the account) and to link the transaction identifier to an account of the other user (e.g., that approved the request). In this way, the server device may be enabled to portion a single transaction among multiple accounts.

The server device may be enabled to settle the transaction in a single event with the vendor based on providing resources to the vendor and identifying the transaction identifier. The server device may be enabled to collect resources for the transaction from multiple user accounts. For example, the server device may charge each account linked with the transaction identifier based on a portion of the transaction that is to be associated with the account. For example, the server device may reduce a balance or a charge to the account that is originally associated with the transaction by an amount of the transaction amount that is to be associated with one or more other accounts, as described above. Similarly, the server device may charge or increase a balance of another account by a portion of the transaction amount that is to be associated with the other account.

In this way, the server device associated with the institution may be enabled to create a one-to-many relationship for a single transaction to simplify a process for splitting the transaction among multiple accounts. For example, some implementations described herein enable the transaction to be initiated and completed at a transaction terminal in a single transaction, thereby reducing a time and overhead that would have otherwise been used to split a transaction into multiple transactions and manually process multiple transaction cards. Moreover, some implementations described herein enable the server device to settle the transaction with the vendor in a single event using the transaction identifier.

Additionally, some implementations described herein reduce a complexity and overhead that would have otherwise been present if a user were to use a third party application or service to collect resources for the transaction and transfer the resources to the account associated with the user that was used to complete the transaction. For example, as the server device may be associated with the same institution as the accounts of the users who are splitting a transaction, the server device may be enabled to associate payments or splits between accounts with a particular transaction (e.g., rather than a payment for a split or transaction being unrelated to or not linked with a particular transaction). Moreover, some implementations described herein provide a more secure manner of splitting a transaction that does not require that a user share any sensitive information, account information, an account number, and/or a routing number, among other examples.

FIGS. 1A-1D are diagrams of an example 100 associated with establishing one-to-many relationships for events in a relational database. As shown in FIGS. 1A-1D, example 100 includes a transaction device, a transaction terminal, a transaction backend system, an event splitting system, a first user device, and a second user device. These devices are described in more detail in connection with FIGS. 2 and 3.

As shown in FIG. 1A, a user may initiate a transaction with an entity (e.g., a vendor, a merchant, or another entity). As used herein, "event" may refer to a transaction, an exchange, an electronic exchange, a sale, an account event, and/or a transfer, among other examples. "Transaction" and "event" may be used interchangeably herein. As shown by reference number 105, the transaction device may communicate with, or interact with, the transaction terminal to initiate the transaction. For example, in some implementations, the user may present the transaction device at a transaction terminal of the entity. In some implementations, the transaction terminal may receive an indication of an identifier of the transaction device. For example, the user may input the identifier of the transaction device to the transaction terminal. In some implementations, such as in an online transaction, the transaction terminal may be a page or application executing on a user device and the user may input the identifier of the transaction device to the page or application. In some implementations, the transaction may be an automated transaction or an automatic transaction. For example, the user may approve a reoccurrence of the transaction, such as for bill paying or for other transactions that occur periodically. The user may approve the transaction to be initiated (e.g., automatically) without explicitly providing the transaction device or the identifier of the transaction device.

As shown by reference number 110, the transaction terminal may transmit, and the transaction backend system may receive, information associated with the transaction. For example, the transaction terminal may transmit transaction information associated with the transaction. The transaction information may include an amount, a location, a time, an identifier of the transaction, and/or an identifier of the entity, among other examples. Additionally, the transaction terminal may transmit an indication of the identifier associated with the transaction device. As shown by reference number 115, the transaction backend system may transmit, and the event splitting system (or another device associated with the event splitting system) may receive, the information associated with the transaction. For example, the transaction backend system may request approval for the transaction. The event splitting system may be associated with an institution (e.g., a financial institution, a bank, and/or a credit card company) that provided or that manages the transaction device and/or an account associated with the transaction device. Therefore, the transaction backend system may request approval from the event splitting system (or another device associated with the event splitting system and the institution) to complete the transaction. For example, the event splitting system (or another device associated with the event splitting system and the institution) may receive, from the transaction backend system associated with the entity, an indication of the transaction (e.g., of an event) that is associated with a first account (e.g., and the transaction device) and the entity. In some implementations, the indication of the event may indicate an exchange amount associated with the event.

In some implementations, the event splitting system (or another device associated with the event splitting system and the institution) may determine that the transaction may be completed. For example, the event splitting system (or another device associated with the event splitting system and the institution) may determine that the account associated with the transaction device is associated with sufficient resources (e.g., has a sufficient credit balance or account balance) to complete the transaction. Therefore, the event splitting system (or another device associated with the event splitting system and the institution) may transmit, and the transaction backend system may receive, an indication that the transaction is approved. The transaction backend system may proceed with processing and completing the transaction.

As shown by reference number 120, based on the transaction being approved and/or completed, the event splitting system may generate, in a relational database, a record to link an identifier associated with the account (e.g., with a first account) with the transaction (e.g., with a transaction identifier of the transaction). For example, the event splitting system may establish a record or entry in the relational database to link an identifier associated with the first account with the identifier associated with the event (e.g., with the transaction identifier of the transaction). For example, as shown in FIG. 1A, an identifier of the account may be "Account A" and a transaction identifier of the transaction may be "Transaction A." As shown in FIG. 1A, in some implementations, the record or entry in the relational database may also link the first account with the identifier associated with the information associated with the transaction. For example, the event splitting system may establish a record or entry in the relational database to link an identifier associated with the first account with the identifier associated with the event (e.g., with the transaction identifier of the transaction), with an identifier of the entity associated with the event (e.g., "Vendor A"), with an indication of an amount associated with the event (e.g., "$50"), and/or with an indication of a date associated with the event (e.g., "04-25-2020"), among other examples. As shown in FIG. 1A, the relational database may include records linking other transactions to the first account (e.g., "Account A") and/or records linking other transactions to other accounts. As described in more detail herein, the event splitting system may use the relational database to update and/or determine a balance of an account. For example, the event splitting system may parse the relational database to charge or add an amount of a transaction to a balance associated with an account linked to the transaction. As used herein, the first account (e.g., the account associated with the transaction or the event) may be referred to as a main account.

Figure 1B:
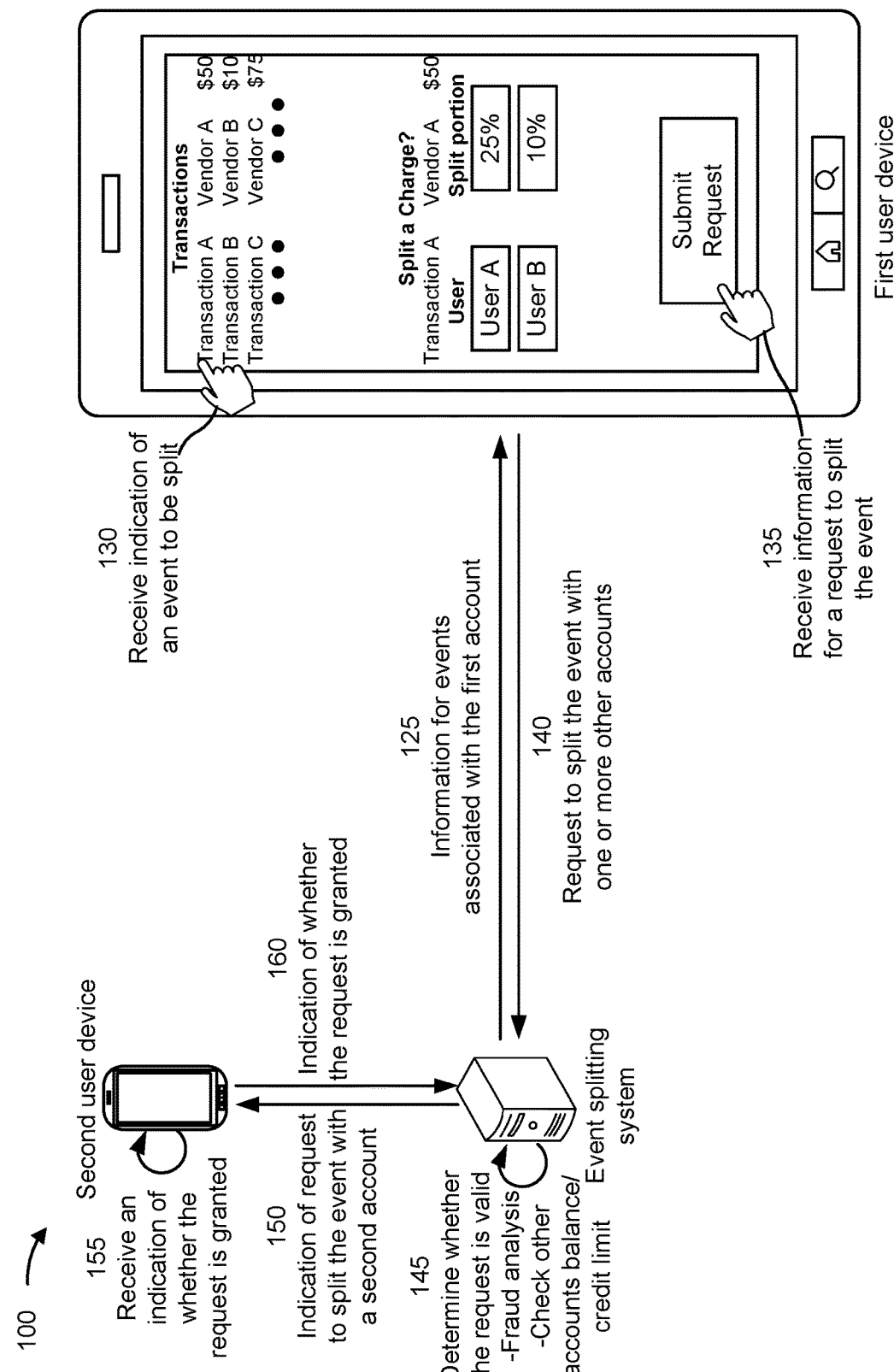

As shown in FIG. 1B, the event splitting system may charge or add an amount associated with the transaction to a balance associated with the main account (e.g., with the first account). For example, the event splitting system may add the amount associated with the transaction to the balance and may add an indication of the transaction to a ledger or other database associated with the main account. As shown by reference number 125, the event splitting system may transmit, and the first user device may receive, information for events associated with the main account. For example, the first user device may receive information associated with the transaction for display by the first user device. The information associated with the event may indicate that a total amount associated with the event is associated with the main account. For example, the user device may include a user interface (e.g., a graphical user interface). Based on receiving the information for events associated with the main account, the first user device may display, via the user interface, the information for the events associated with the main account. For example, as shown in FIG. 1B, the first user device may display information for the transaction described in connection with FIG. 1A (e.g., "Transaction A) and/or one or more other transactions (e.g., "Transaction B" and "Transaction C"). In some implementations, the first user device may display a page (e.g., a web page) associated with the institution (e.g., that provides and/or manages the main account) to enable the first user device to display the information for the events associated with the main account. In some other implementations, the first user device may execute an application associated with the institution to enable the first user device to display the information for the events associated with the main account.

As shown by reference number 130, the first user device may receive an indication of an event (e.g., of a transaction) to be split. As used herein, splitting a transaction or an event may refer to associating the transaction or the event with multiple accounts, rather than just the main account. In some implementations, the first user device may receive an input (e.g., from a user) indicating the event (e.g., the transaction) to be split. For example, the user may select the event from a list of events displayed by the first user device (e.g., by providing an input to the first user device indicating the event from the list of events). Alternatively, the user may provide an identifier, or another indication associated with an event, as the input to the first user device (such as in an implementation in which the first user device does not display the list of events associated with the main account).

As shown by reference number 135, the first user device may receive information for a request to split the selected event. For example, the information may include an indication of the event (e.g., a transaction identifier associated with the event), an indication of one or more other accounts to be associated with the event, and/or an indication of a portion of the amount associated with the event to be associated with each account of the one or more other accounts, among other examples. As used herein, an account to be associated with a transaction (e.g., in addition to the main account) may be referred to as an additional account (e.g., the one or more other accounts may be additional accounts). In some implementations, additional accounts may be accounts associated with the institution (e.g., associated with the same institution as the main account and/or the transaction device used to initiate the transaction as described elsewhere herein). In some implementations, the first user device may receive, via an input to the user interface of the first user device, an indication to split an event with an additional account. In some implementations, the indication to split the event may indicate a unique identifier associated with the additional account and may indicate a portion of an amount associated with the event to be associated with the additional account.

In some implementations, the portion of the amount to be associated with an additional account may be a percentage (e.g., 5%, 25%, 50%, and/or other percentages) or an amount (e.g., $5.00, $20.00, $50.00, and/or other amounts), among other examples. For example, as described elsewhere herein, the amount associated with the event (e.g., the transaction) to be split may be $50.00. As shown in FIG. 1B, the request to split the event may indicate that 25% of the event is to be associated with a first user (e.g., "User A") and 10% of the event is to be associated with a second user (e.g., "User B"). Therefore, the request to split the event may indicate that $12.50 (e.g., 25%) of the $50.00 event is to be associated with a first additional account of the first user and that $5.00 (e.g., 10%) of the $50.00 event is to be associated with a second additional account of the second user.

In some implementations, the unique identifier associated with an additional account may be an identifier associated with a user that is associated with the additional account. For example, the unique identifier may not indicate sensitive information associated with the additional account, such as an account number and/or a routing number, among other examples. In some implementations, the unique identifier may be selected from a list or database of unique identifiers. For example, the event splitting system may maintain a list or database of unique identifiers that links each unique identifier to an account. The event splitting system may transmit, to the first user device, an indication of the unique identifiers. The user may identify a unique identifier associated with a user based on the list or database provided to the first user device. For example, another user may share a unique identifier associated with the other user (e.g., and an account associated with the other user) with the user to enable the user to request a split of an event with the other user.

In some implementations, the first user device may receive, store, and/or display a list of approved unique identifiers available for the user to select for a request to split an event. For example, the first user device and other user devices (and/or the event splitting system) may communicate to request and/or approve permission to be added to a list of available users for the user to select for a request to split an event. For example, the first user device may transmit, to the second user device (via the event splitting system in some implementations), a request for permission to make a unique identifier associated with a user of the second user device available for the user to select for a request to split an event. If the second user device transmits an approval of the permission, then the unique identifier associated with a user of the second user device (e.g., "User A") may be added to a list of approved unique identifiers available for the user to select for a request to split an event. Therefore, in some implementations, when selecting a unique identifier to be associated with the request to split the event, only unique identifiers included in the list of approved unique identifiers may be selected by the user of the first user device. This may improve security and reduce fraudulent requests by ensuring that a user has permission to request a split of an event with another user prior to the user submitting the request.

In some implementations, the first user device may search for other users based on personally identifiable information associated with the other users. For example, the first user device may search for a unique identifier associated with a user using a phone number associated with the user, an e-mail associated with the user, a name of the user, a username associated with the user, and/or a unique code or number associated with the user, among other examples. The first user device may identify the unique identifier associated with the user (and associated with an account of the user) based on searching for the user (e.g., in a database provided by the event splitting system). In some implementations, the first user device may add the unique identifier to a list of unique identifiers stored by the first user device (e.g., to enable the user of the first user device to quickly identify a unique identifier included in the list).

In some implementations, the first user device may communicate with one or more other user devices (e.g., the second user device) to obtain unique identifiers for users associated with the one or more other user devices. For example, the first user device may communicate (e.g., via Bluetooth communication, near-field communication, or other wireless communication techniques) with the second user device when the second user device is located proximate to the first user device (e.g., within a threshold range of the first user device) to obtain a unique identifier for a user associated with the second user device. The unique identifier for the user associated with the second user device (e.g., "User A") may be made available for selection for the request to split the event based on the first user device obtaining the unique identifier. Therefore, the first user device may be enabled to provide unique identifiers for users located proximate to the first user device for selection for the request to split the event.

In some implementations, information associated with the request to split the event may include recurrence information. Recurrence information may indicate information associated with repetitions of future transactions or events to be associated with the split. For example, in some implementations, an event or a transaction may be reoccurring or periodic, such as for a monthly bill or a subscription. Therefore, each event may be associated with a similar split among multiple accounts. For example, users living in the same house may wish to split a utility bill among accounts associated with the users each month. Therefore, when submitting an initial request to split an event, a user may indicate recurrence information such that future similar transactions are associated with the same split. The recurrence information may include an identifier of the event, an identifier associated with one or more additional accounts (e.g., a unique identifier of a user associated with an additional account), a portion of an amount of the event to be associated with one or more additional accounts, and/or periodic information (e.g., information indicating a periodicity of events, such as weekly, bi-monthly, monthly, every six months, yearly, or another period), among other examples. This may enable the event splitting system to split future events or future transactions (identified based on the recurrence information) among the accounts indicated by the request without the event splitting system receiving an additional request. This may conserve resources that would have otherwise been used to transmit a request to split the event each time the event occurs or is completed (e.g., each time the periodic or recurring transaction is completed).

As shown by reference number 140, the first user device may transmit, and the event splitting system may receive, a request to split the event (e.g., "Transaction A") with one or more additional accounts (e.g., an account associated with "User A" and an account associated with "User B"). For example, the first user device may transmit, to the event splitting system, a request to split the event with a second account (e.g., an additional account), where the request indicates the unique identifier associated with the second account (e.g., "User A") and the portion of the amount associated with the event to be associated with the second account (e.g., 25%). In some implementations, the first user device may transmit the request to split the event with the second account to enable the event splitting system associated with the institution to split the amount of the event between the first account and the second account (and one or more other accounts).

For example, the event splitting system may receive, from the first user device, a request to generate a one-to-many relationship with the event and one or more other accounts (e.g., from the current one-to-one relationship associated with the event), where the request indicates a portion of the amount of the event to be associated with a first account (e.g., 25%) and a second portion of the amount to be associated with a third account (e.g., 10%). The event splitting system may identify the event (e.g., the transaction) and the accounts associated with the request based on the information provided by the first user device. For example, the event splitting system may identify the main account and one or more additional accounts associated with the request to split the event. The event splitting system may identify the event based on an identifier (e.g., an event identifier or a transaction identifier) indicated by the request to split the event.

As shown by reference number 145, the event splitting system may determine whether the request is valid. For example, the event splitting system may determine if the event indicated by the request is a valid event. For example, the event splitting system may search or parse a database (e.g., a relational database) for an identifier associated with the event to determine if the identifier is included in the database (e.g., and therefore the event identified by the identifier is a valid event). In some implementations, the event splitting system may determine if the main account and/or the one or more additional accounts indicated by the request are valid. For example, the event splitting system may determine if the main account and/or one or more additional accounts are real and/or active accounts associated with the institution.

In some implementations, the event splitting system may perform, based on receiving the request to split the event and using a fraud model, a fraud analysis to determine a fraud score associated with the request. For example, the event splitting system may determine the fraud score based on a location of the first user device (e.g., if the first user device is located a large distance from a location of the event, then the event splitting system may determine a higher likelihood of fraud), a number of requests made by the first user device (or a user associated with the first user device) (e.g., a higher number of requests (e.g., within an amount of time) may indicate a higher likelihood of fraud), an amount of time between an occurrence of the event and the request being transmitted to the event splitting system, a number of previous requests made by the first user device associated with the additional account(s) indicated by the request, an amount associated with the event, and/or the portion(s) indicated by the request (e.g., allocating all or a majority of an amount of an event to another account may indicate fraud), among other examples. The event splitting system may use one or more (or all) of the factors described above as an input to the fraud model. The fraud model may output the fraud score. In some implementations, the determination of whether the request is valid may be based on the fraud score. For example, if the fraud score is greater than or equal to a threshold value, then the event splitting system may determine that the request is fraudulent and is therefore not valid. If the fraud score is less than the threshold value, then the event splitting system may determine that the request is not fraudulent and therefore may be valid.

In some implementations, the event splitting system may determine if an additional account indicated by the request is capable of accepting the portion of the amount of the event allocated to the additional account by the request based on one or more attributes (e.g., a credit limit, an account balance, and/or a remaining balance, among other examples) associated with the additional account. For example, the event splitting system may determine a portion of the amount of the exchange to be associated with the additional account based on the request to split the event. For example, if the amount of the event is $50.00 and the portion indicated by the request is 25%, then the event splitting system may determine if the additional account is capable of accepting a charge for $12.50 (e.g., 25% of $50.00). An account may be capable of accepting a portion of the amount of the event if an account balance or a credit limit associated with the account is greater than or equal to the portion. For example, the event splitting system may determine whether the account balance or the credit limit associated with the additional account is greater than or equal to $12.50. If the additional account is capable of accepting the portion of the amount of the event (e.g., as indicated by the request to split the event), then the event splitting system may determine that the request is valid for that additional account. The event splitting system may perform similar determinations for each additional account indicated by the request to split the event.

In some implementations, the event splitting system may determine whether portions indicated by the request are valid. For example, event splitting system may determine whether a portion indicated by the request is less than a total amount associated with the event (e.g., to ensure that an amount to be associated with another account does not exceed the total amount of the event). If the event splitting system determines that a portion indicated by the request for a given account is greater than or equal to the total amount associated with the event, then the event splitting system may determine that the request is not valid (e.g., for the given account and/or that the entire request is not valid). For example, if the total amount of the event is $50, then the event splitting system may determine whether a portion to be associated with any given account is greater than or equal to $50 (e.g., to ensure that a request to split the event does not allocate more than $50 to a single account). In some implementations, the event splitting system may determine whether a portion to be associated with any given account is within a threshold amount of the total amount associated with the event. For example, if the event splitting system determines that a portion to be associated with a given account is within a threshold amount of the total amount associated with the event, then the event splitting system may determine that the request is not valid (e.g., that the request is not valid for the given account and/or that the entire request is not valid).

In some implementations, the event splitting system may determine that the request to split the event is valid for one or more additional accounts indicated by the request. In some implementations, the event splitting system may determine that the request to split the event is not valid for one or more additional accounts indicated by the request. In some implementations, if the event splitting system determines that the request to split the event is not valid (e.g., entirely or for one or more additional accounts), then the event splitting system may transmit, to the first user device, an indication that the request to split the event is not valid. In some implementations, if the request to split the event is valid for at least one additional account, then the event splitting system may proceed with processing the request as explained in more detail elsewhere herein. Alternatively, if the request to split the event is not valid for at least one account, then the event splitting system may cancel the request and/or may refrain from continuing to process the request.

As shown by reference number 150, the event splitting system may transmit, and the second user device may receive, an indication of the request to split the event with an account associated with the second user device. For example, the account associated with the second user device may be an additional account indicated by the request to split the event. The event splitting system may transmit an indication of the request to split the event to user devices associated with each additional account indicated by the request and/or user devices associated with each additional account for which the request is valid, as determined by the event splitting system.

In some implementations, the indication of the request to split the event with an account associated with the second user device may be an approval request associated with the request to split the event. For example, the event splitting system may transmit, to the second user device, an approval request for the split of the event. In some implementations, the approval request may request approval to generate a one-to-many relationship with the event and the additional account associated with the second user device. In some implementations, the approval request may be transmitted via a text message, a voice message, and/or an e-mail, among other examples. In some implementations, the transmission of the approval request may cause a notification of the approval request to be provided by the second user device (e.g., the second device may provide haptic feedback and/or may display an indication of the notification).

In some implementations, the approval request may indicate a portion of the amount of the event to be associated with the additional account and/or information associated with the event. For example, the approval request may identify an amount associated with the event, an entity associated with the event, a date of the event, and/or a time of the event, among other examples. For example, if the second user device is associated with "User A," then the approval request may indicate the event (e.g., may indicate that the event is associated with a transaction with "Vendor A" for $50.00) and/or may indicate a portion of the amount of the event that is to be associated with the account associated with the "User A" (e.g., 25% and/or $12.50).

As shown by reference number 155, the second user device may receive an indication of whether the request is granted for the account associated with the second user device. For example, a user associated with the second user device may review the approval request and may provide an input indicating whether the request to split the event is approved or denied for the account associated with the second user device. In some implementations, the second user device may receive an indication of a modified request to split the event (e.g., based on an input provided by the user associated with the second user device). In such examples, the event splitting system may transmit, to the first user device, an approval request for the modified request to split the event, in a similar manner as described in connection with transmitting the approval request to the second user device.

In some implementations, the second user device may receive an indication of a modified request to split the event (e.g., based on an input provided by the user associated with the second user device). For example, the modified request may change or modify a value of one or more parameters indicated by the request and/or may add an additional parameter to be associated with the split of the event (e.g., the modified request may indicate a different portion of the event to be allocated to an account associated with the user of the second user device). In such examples, the event splitting system may transmit, to the first user device, an approval request for the modified request to split the event, in a similar manner as described in connection with transmitting the approval request to the second user device. As a result, the event splitting system may enable a negotiation between the first user device and the second user device to determine the one or more parameters associated with the split of the event (e.g., may enable a negotiation for an amount of the event to be allocated to each account).

As shown by reference number 160, the second user device may transmit, and the event splitting system may receive, an indication of whether the request is granted for the account associated with the second user device. The event splitting system may receive indications of whether the request is granted for one or more (or all) additional accounts indicated by the request to split the event. In some implementations, the event splitting system may determine that the request is denied for an account if the event splitting system has not received a response to an approval request within a threshold amount of time.

In some implementations, the event splitting system may transmit, and the first user device may receive, an indication of additional accounts for which the request to split the event has been denied. In some implementations, the event splitting system may transmit, and the first user device may receive, an indication of whether the request to split the event with one or more additional accounts is approved. For example, the event splitting system may receive, from a user device (such as the second user device), an indication that the request to split the event has been denied for an account. The event splitting system may transmit, to the first user device, an indication that the request to split the event has been denied for the account. In some implementations, if the request to split the event is denied for any account indicated by the request, then the event splitting system may cancel the request and/or may refrain from continuing to process the request. In some implementations, if the request to split the event is denied for an account indicated by the request, then the event splitting system may continue to process the request without including the account (e.g., if the request associated with the "User B" is denied, then the event splitting system may not charge or allocate the 10% of the amount of the event to the account associated with the "User B," as described in more detail elsewhere herein).

In some implementations, the first user device may receive an indication that the request to split the event is approved for a first additional account and an indication that the request to split the event is not approved for a second additional account. The first user device may receive information associated with a modified request (or a new request) to split the event based on receiving the indication that the original request to split the event was not approved for at least one additional account. For example, the first user device may receive an indication of a different portion or a different allocation to be split among additional accounts for the event. For example, the user associated with the first user device may modify the split portions for the event based on receiving the indication that the request to split the event is not approved for at least one additional account. In some implementations, the first user device may transmit, and the event splitting system may receive, an additional request to split the event, where the additional request indicates a different portion of the amount of the event to be associated with one or more additional accounts (e.g., a different portion as compared to a portion indicated by the original request).

Figure 1C:
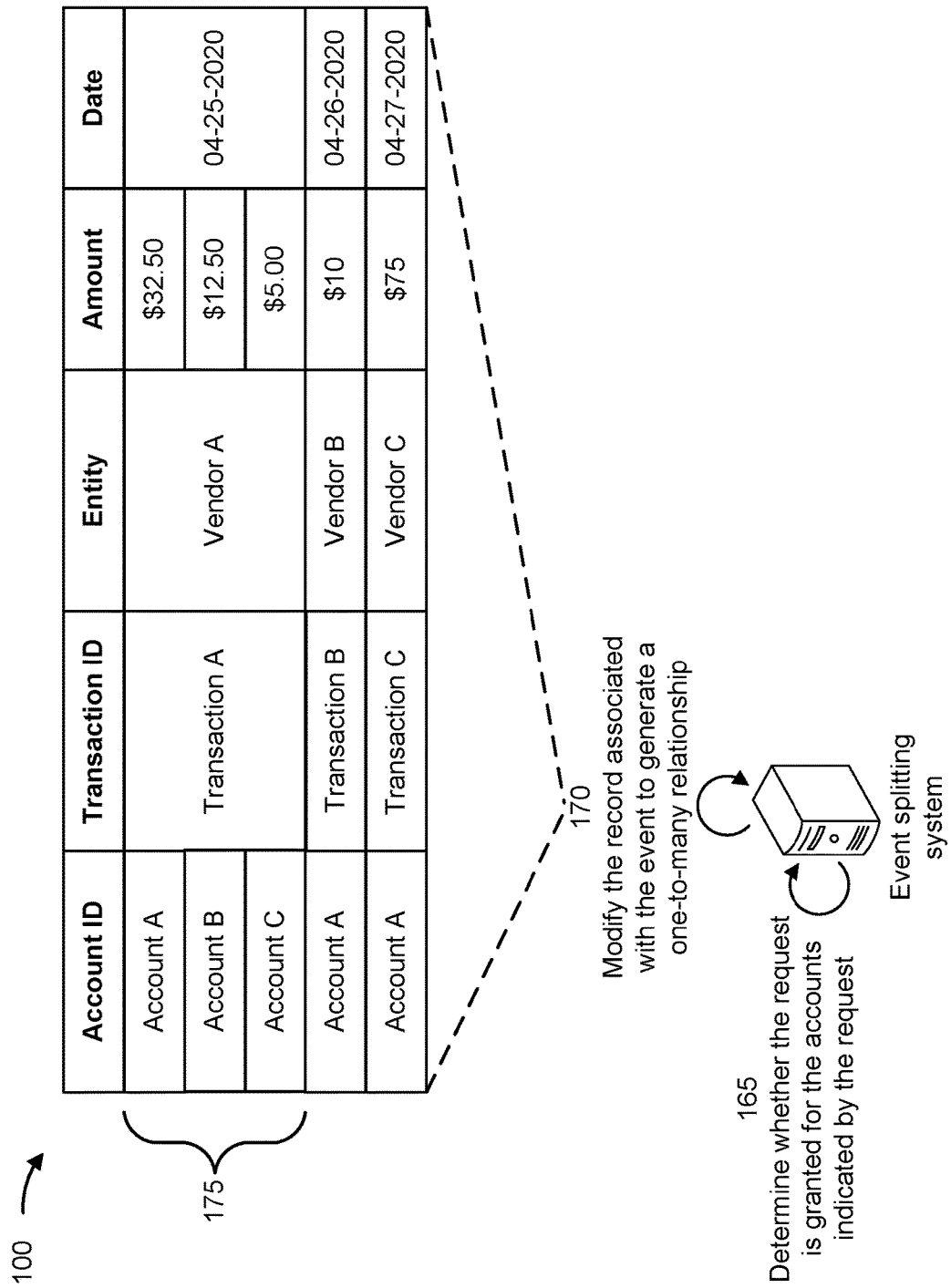

As shown in FIG. 1C, the event splitting system may determine one or more accounts to be associated with a one-to-many relationship for the event based on the request to split the event and/or based on receiving indications of whether the request to split the event is approved for one or more additional accounts indicated by the request. For example, as shown by reference number 165, the event splitting system may determine whether the request to split the event is granted or approved for the accounts (e.g., the additional accounts) indicated by the request. In some implementations, the event splitting system may determine, for one or more additional accounts indicated by the request to split the event, whether the one-to-many relationship can be generated. For example, the event splitting system may determine for which additional accounts indicated by the request to split the event approval of the request has been received. The event splitting system may determine an allocation of resources among the main account and one or more additional accounts for the amount associated with the event based on determining the additional accounts indicated by the request to split the event for which approval of the request has been received.

For example, if the event splitting system receives approval to split the event for an account associated with the "User A" (e.g., an "Account B" as shown in FIG. 1C) and receives approval to split the event for an account associated with the "User B" (e.g., an "Account C" as shown in FIG. 1C), then the event splitting system may determine that 25% of the amount of the event is to be allocated to the "Account B," 5% of the amount of the event is to be allocated to the "Account C," and the remaining 70% of the amount of the event is to be allocated to the "Account A" (e.g., the main account). Alternatively, in some implementations, if the event splitting system receives approval to split the event for an account associated with the "User A" (e.g., the "Account B") and receives a denial to split the event for an account associated with the "User B" (e.g., the "Account C"), then the event splitting system may determine that 25% of the amount of the event is to be allocated to the "Account B," and the remaining 75% (e.g., including the 5% of the amount that was requested to be allocated with the "User B") of the amount of the event is to be allocated to the "Account A" (e.g., the main account). In other words, the main account may be held responsible for portions of the amount of the event that are denied or not approved for additional accounts indicated by the request to split the event.

As shown by reference number 170, the event splitting system may modify the record, in the relational database (e.g., described in connection with FIG. 1A), associated with the event to generate a one-to-many relationship for the event and associated accounts. For example, the event splitting system may modify the record to generate the one to many relationship to link the event with the identifier of the main account and an identifier of an additional account. The record may indicate that the additional account is associated with a portion of the exchange amount (e.g., $12.50 or $5.00), and the record may indicate that the main account is associated with a portion of the exchange amount (e.g., $32.50, which may be the remaining amount of the event, less portion(s) of the amount allocated to additional account(s)).

For example, the event splitting system may modify, in the relational database and based on the determination that the one-to-many relationship can be generated, the record to link the event with the identifier associated with the main account and an identifier associated with each of the one or more additional accounts. The record may indicate a portion of the amount of the event associated with each account. In some implementations, the event splitting system may generate sub-records for each account linked with the event under a record associated with the event. For example, the event splitting system may generate a first sub-record for the record associated with the main account and a first portion (e.g., $32.50) of the exchange amount. For example, as shown by reference number 175, the event splitting system may generate a second sub-record for the record associated with a first additional account (e.g., "Account B") and a second portion (e.g., $12.50) of the exchange amount. The event splitting system may generate a third sub-record for the record associated with a second additional account (e.g., "Account C") and a fourth portion (e.g., $5.00) of the exchange amount. As shown in FIG. 1C, a sum of the first portion, the second portion, and the third portion may be equal to the exchange amount (e.g., $32.50+$12.50+$5.00=$50.00).

In this way, the event splitting system may establish a cardinality for the event that links the event to multiple accounts within the same relational database, such that the event splitting system may allocate portions of the amount associated with the event to multiple accounts while also maintaining a single record for the event in the database. Maintaining the single record for the event in the database may reduce complexity for the event splitting system in processing and settling the event. For example, a single identifier may be maintained for the event (e.g., linked to multiple accounts) to enable the event splitting system to settle the event with the entity (e.g., the vendor or the merchant) associated with the event in a single settlement (e.g., rather than having multiple identifiers for the event requiring multiple settlements with the entity). Moreover, the event splitting system may properly allocate portions of the amount of the event to different accounts using the one-to-many relationship and/or the sub-records indicated by the relational database.

Figure 1D:
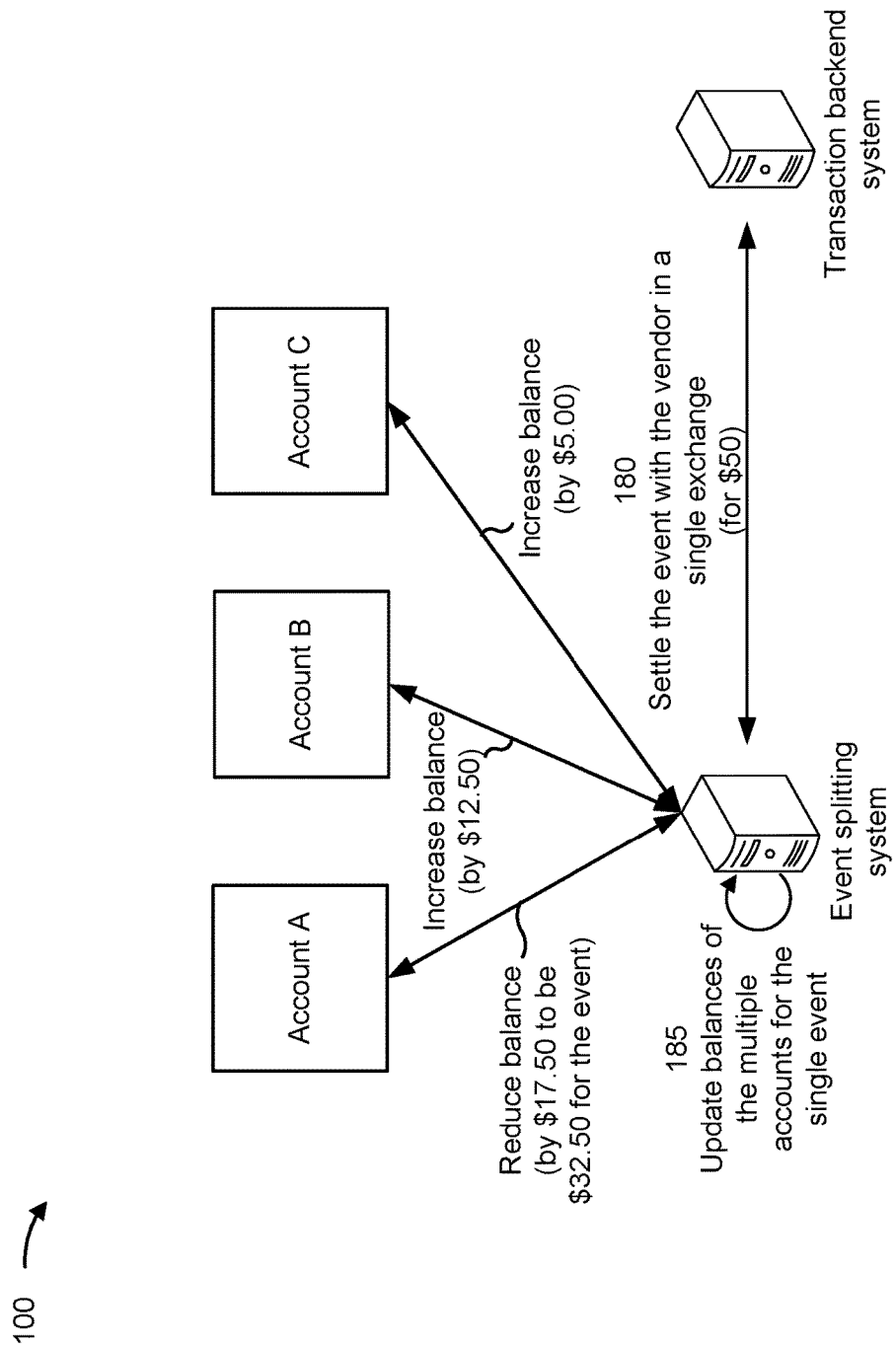

As shown in FIG. 1D, the event splitting system may update balances for the accounts linked to the event and may settle the event with the entity associated with the event. For example, the event splitting system may perform, based on the record in the relational database, one or more actions to complete the event. For example, as shown by reference number 180, the one or more actions may include performing, with a transaction backend system associated with the entity, a single exchange associated with the event based on the amount of the event. For example, the event splitting system may provide resources to the entity for the amount of the event (e.g., $50) and may indicate that the resources are to settle the event. For example, the event splitting system may indicate the identifier (such as a transaction identifier) associated with the event when settling the event, such that the transaction backend system is enabled to identify that the resources provided by the event splitting system are to settle the event. In this way, the transaction backend system may view the event as a one-to-one relationship (e.g., one event (e.g., one transaction) and one settlement) and may not have a knowledge of how the event is allocated among multiple accounts. This may reduce a complexity for processing and settling the event as the event splitting system and the transaction backend system are not required to settle multiple events or multiple transactions for the single event.

As shown by reference number 185, the one or more actions include the event splitting system updating a balance associated with the main account (e.g., "Account A") to reduce the balance based on modifying the record, and updating a balance associated with one or more additional accounts to increase the balance of the additional accounts based on modifying the record. In other words, the event splitting system may reduce a balance or increase a limit associated with the main account by a portion of the amount of the event (e.g., $17.50, or $12.50+$5.00), indicated by the request to split the event, that is to be associated with the one or more additional accounts. The event splitting system may increase a balance or reduce a limit associated with a first additional account (e.g., "Account B") by the portion of the amount of the event (e.g., $12.50), indicated by the request to split the event, that is to be associated with the first additional account. Similarly, the event splitting system may increase a balance or reduce a limit associated with a second additional account (e.g., "Account C") by the portion of the amount of the event (e.g., $5.00), indicated by the request to split the event, that is to be associated with the second additional account.

For example, the event splitting system may charge the additional account(s) linked with the event by the portion(s) of the amount associated with the event to be allocated to the additional account(s). Similarly, the event splitting system may credit the main account linked with the event by an amount equal to the portion(s) of the amount associated with the event to be allocated to the additional account(s). In some implementations, the event splitting system may transfer resources (e.g., credit) from the additional account(s) to the main account. For example, resources charged to an additional account may be used by the event splitting system to reimburse the main account for the event. As a result, the main account may be reimbursed for the event (e.g., for a transaction that was entirely charged to the main account) via resources associated with one or more additional accounts. For example, the event splitting system may transfer $17.50 in credit (e.g., $12.50 from "Account B" and $5.00 from "Account C") to the main account (e.g., "Account A") based on modifying the record associated with the event, as described in more detail elsewhere herein.

In some implementations, a bill for a main account that includes the event may be paid prior to the event being split among multiple accounts. For example, resources of the main account may have been used to complete the event (e.g., a balance or a credit charged to the main account that included the amount of the event may have been paid). The event splitting system may identify that resources of the first account have been used to complete the event. The event splitting system may provide a credit (e.g., may increase an available balance or an available credit limit) to the main account, where an amount of the credit is based on the portion(s) of the amount associated with the event to be allocated to the additional account(s). The event splitting system may increase a balance or reduce a limit associated with the additional account(s) based on the portion(s) of the amount of the event to be associated with each additional account.

In some implementations, the event splitting system may transmit, and the first user device may receive, an indication of a balance associated with the main account for display by the first user device. In some implementations, the balance may indicate a modified balance associated with the account based on a portion of the amount associated with the event to be associated with the additional account(s) if the request to split the event is approved. Alternatively, the balance may indicate an unmodified balance (e.g., indicating that the entire amount of the event is associated with, or charged to, the main account) associated with the main account if the request to split the event is not approved. The first user device may display the balance of the main account. This may enable the user associated with the first user device to identify if the event is actually and/or successfully split among the multiple accounts.

In some implementations, rather than a single debtor (e.g., an account that owes resources for an event) for the event, the event splitting system may create multiple debtors for a single event (e.g., for a single transaction). This may ensure that the institution associated with the event splitting system is repaid for the event (e.g., as the institution may have provided the resources to settle the event with the entity associated with the event). Moreover, this may enable users to apportion an amount of the event among multiple accounts without being required to transfer funds outside of the institution. This improves a security associated with the apportioning of the amount of the event among multiple accounts because resources are not required to be transferred outside of devices associated with the institution and users are not required to share sensitive information associated with the accounts.

As indicated above, FIGS. 1A-1D are provided as an example. Other examples may differ from what is described with regard to FIGS. 1A-1D.

Figure 2:
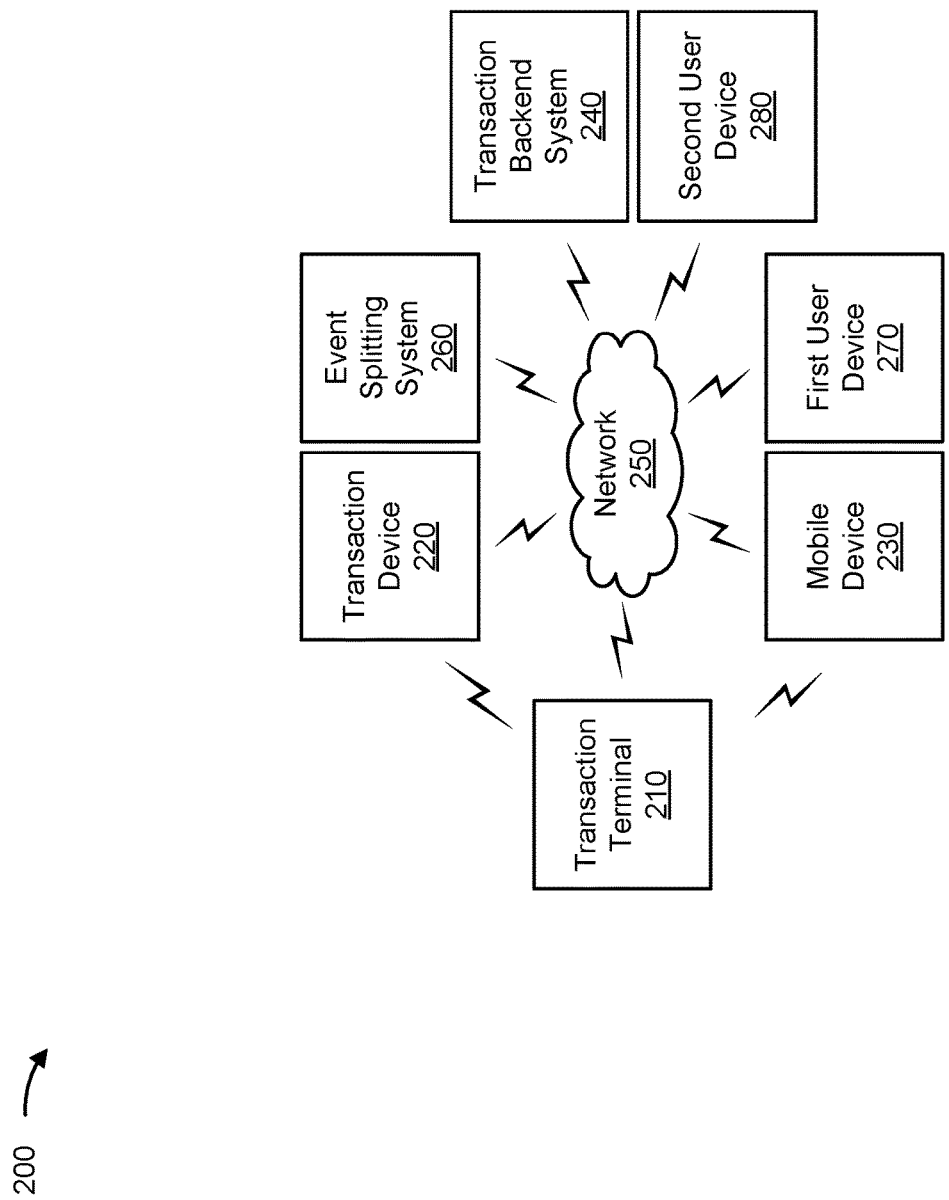
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a mobile device 230, a transaction backend system 240, a network 250, an event splitting system 260, a first user device 270, and/or a second user device 280, among other examples. Devices of environment 200 may interconnect via wired connections and/or wireless connections.

The transaction terminal 210 includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The mobile device 230 includes one or more devices capable of being used for an electronic transaction, as described above in connection with the transaction device 220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 230 may be capable of receiving, generating, storing, processing, and/or providing information associated with establishing one-to-many relationships for events in a relational database (such as one or more actions described in connection with a user device), as described elsewhere herein.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The network 250 includes one or more wired and/or wireless networks. For example, the network 250 may include a cellular network, a public land mobile network, a local area network, a wide area network, a metropolitan area network, a telephone network, a private network, the Internet, and/or a combination of these or other types of networks. The network 250 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The event splitting system 260 includes one or more devices capable of receiving, generating, storing, processing, providing, and/or routing information associated with establishing one-to-many relationships for events in a relational database, as described elsewhere herein. The event splitting system 260 may include a communication device and/or a computing device. For example, the event splitting system 260 may include a server, such as an application server, a client server, a web server, a database server, a host server, a proxy server, a virtual server (e.g., executing on computing hardware), or a server in a cloud computing system. In some implementations, the event splitting system 260 includes computing hardware used in a cloud computing environment.

The first user device 270 and/or the second user device 280 includes one or more devices capable of receiving, generating, storing, processing, and/or providing information associated with establishing one-to-many relationships for events in a relational database, as described elsewhere herein. The first user device 270 and/or the second user device 280 may include a communication device and/or a computing device. For example, the first user device 270 and/or the second user device 280 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
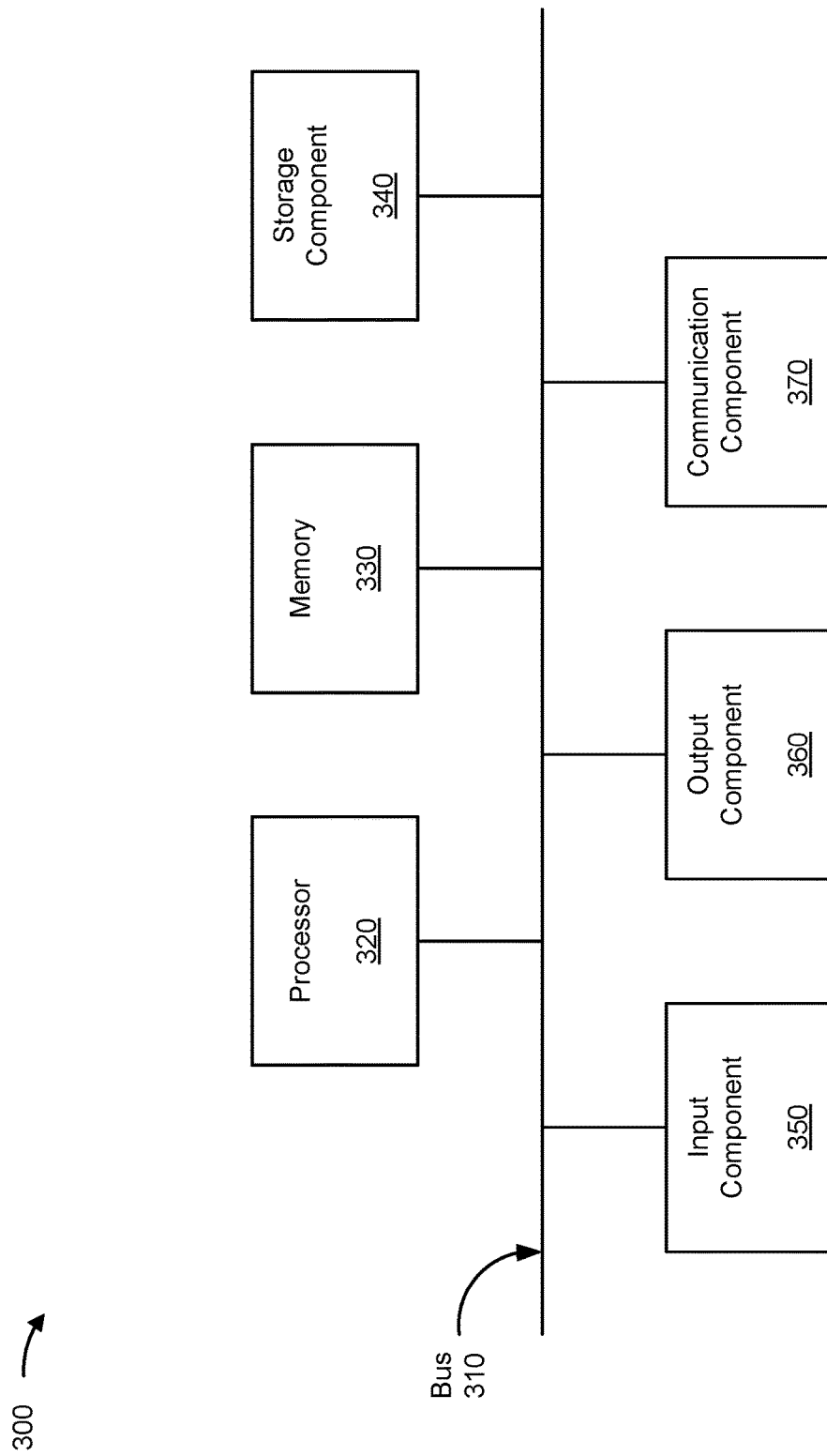
FIG. 3 is a diagram of example components of one or more devices of FIG. 2.

FIG. 3 is a diagram of example components of a device 300, which may correspond to the transaction terminal 210, the transaction device 220, the mobile device 230, the transaction backend system 240, the event splitting system 260, the first user device 270, and/or the second user device 280, among other examples. In some implementations, the transaction terminal 210, the transaction device 220, the mobile device 230, the transaction backend system 240, the event splitting system 260, the first user device 270, and/or the second user device 280, among other examples, may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
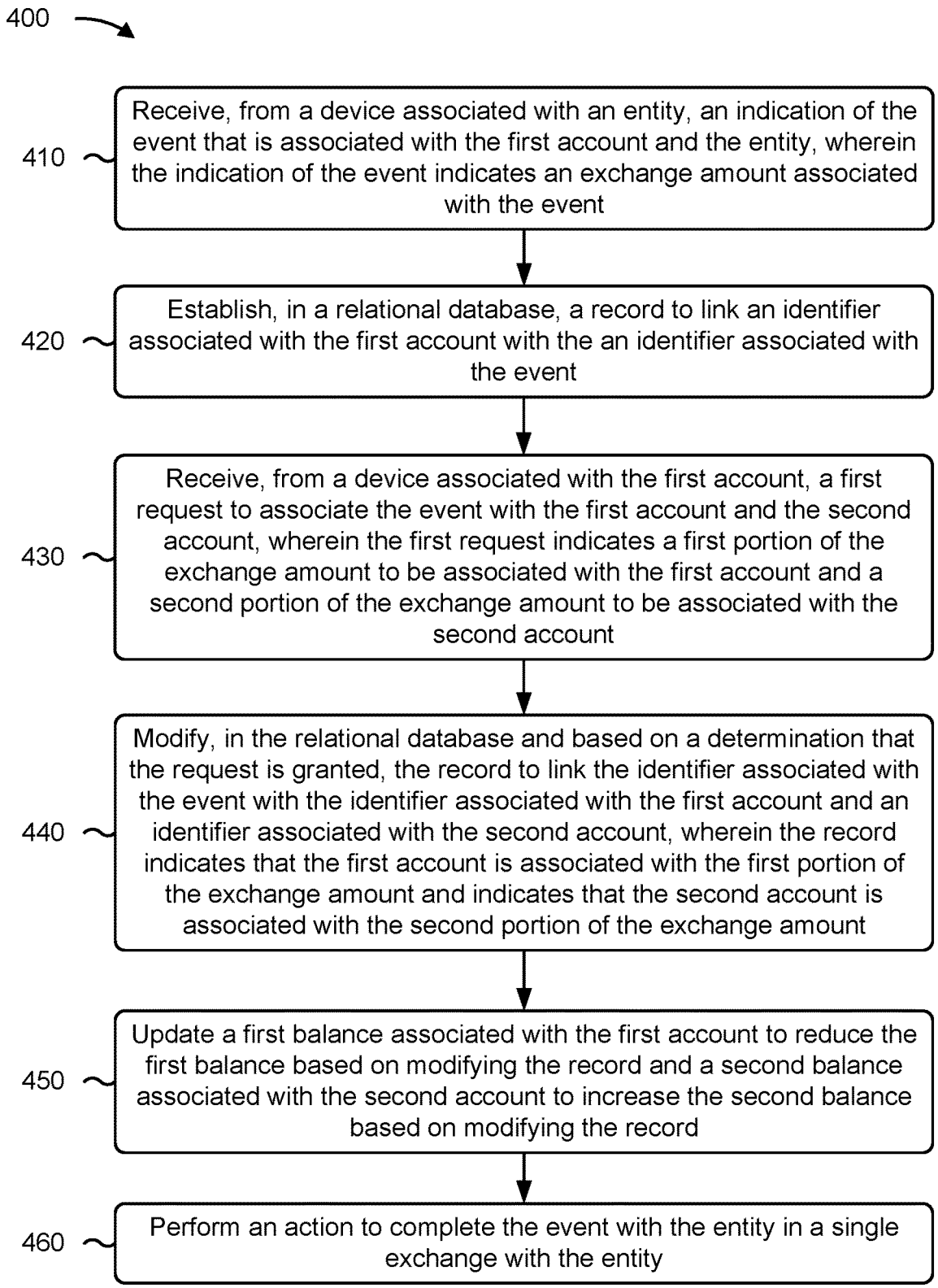
FIG. 4 is a flowchart of an example process relating to establishing one-to-many relationships for events in a relational database.

FIG. 4 is a flowchart of an example process 400 associated with establishing one-to-many relationships for events in a relational database. In some implementations, one or more process blocks of FIG. 4 may be performed by a server device (e.g., the event splitting system 260). In some implementations, one or more process blocks of FIG. 4 may be performed by another device or a group of devices separate from or including the server device, such as the transaction terminal 210, the transaction device 220, the mobile device 230, the transaction backend system 240, the first user device 270, and/or the second user device 280. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a device associated with an entity, an indication of the event that is associated with the first account and the entity (block 410). In some implementations, the indication of the event indicates an exchange amount associated with the event. As further shown in FIG. 4, process 400 may include establishing a record to link an identifier associated with the first account with the identifier associated with the event (block 420). As further shown in FIG. 4, process 400 may include receiving, from a device associated with the first account, a first request to associate the event with the first account and the second account (block 430). In some implementations, the first request indicates a first portion of the exchange amount to be associated with the first account and a second portion of the exchange amount to be associated with the second account. As further shown in FIG. 4, process 400 may include modifying, based on a determination that the request is granted, the record to link the identifier associated with the event with the identifier associated with the first account and an identifier associated with the second account (block 440). In some implementations, the record indicates that the first account is associated with the first portion of the exchange amount and indicates that the second account is associated with the second portion of the exchange amount. As further shown in FIG. 4, process 400 may include updating a first balance associated with the first account to reduce the first balance based on modifying the record and a second balance associated with the second account to increase the second balance based on modifying the record (block 450). As further shown in FIG. 4, process 400 may include performing an action to complete the event with the entity in a single exchange with the entity (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with establishing one-to-many relationships for events in a relational database. In some implementations, one or more process blocks of FIG. 5 may be performed by a user device (e.g., the first user device 270 and/or the second user device 280). In some implementations, one or more process blocks of FIG. 5 may be performed by another device or a group of devices separate from or including the user device, such as the transaction terminal 210, the transaction device 220, the mobile device 230, the transaction backend system 240, and/or the event splitting system 260. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving, via an input to a user interface of the user device, an indication to split an event with a second account (block 510). In some implementations, the indication to split the event includes a unique identifier associated with the second account and a portion of a first amount associated with the event to be associated with the second account. In some implementations, the event is completed with an entity using a medium, the medium associated with the first account and an institution, and the second account is associated with the institution. As further shown in FIG. 5, process 500 may include transmitting, to a server device associated with the institution, a request to split the event with the second account (block 520). In some implementations, the request indicates the unique identifier associated with the second account and the portion of the first amount associated with the event to be associated with the second account. As further shown in FIG. 5, process 500 may include receiving, from the server device, an indication of whether the request to split the event with the second account is approved (block 530). As further shown in FIG. 5, process 500 may include receiving, from the server device, an indication of a balance associated with the account for display by the device (block 540). In some implementations, the balance indicates a modified balance associated with the account based on a second amount of the portion of the first amount associated with the event to be associated with the second account if the request to split the event with the second account is approved. Alternatively, the balance indicates an unmodified balance associated with the account if the request to split the event with the second account is not approved.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Accordingly, the scope of the invention should be determined not by the embodiments illustrated, but by the appended claims and their equivalents.

What is claimed is:

1. A system for establishing one-to-many relationships for events to enable an event to be associated with multiple identifiers, the system comprising:
   one or more memories; and
   one or more processors, coupled to the one or more memories, configured to:
      receive, from a device associated with an entity, an indication of an event that is associated with a first account and the entity and an approval request to complete a transaction associated with the indication of the event, wherein the indication of the event indicates an exchange amount associated with the event, and wherein the device associated with the entity includes a transaction terminal configured to identify only a single account for the transaction;

generate, in a relational database, a record to link an identifier associated with the first account with the event;

receive, from a device associated with the first account, a first request to generate a one-to-many relationship with the event and one or more other accounts, wherein the first request indicates a first portion of the exchange amount to be associated with the first account and a second portion of the exchange amount to be associated with the one or more other accounts;

modify, based on obtaining an approval indication that the first request is approved from the one or more other accounts and in the relational database and based on a determination that the one-to-many relationship can be generated, the record to link the event with the identifier associated with the first account and an identifier associated with each of the one or more other accounts, wherein the record indicates the first portion of the exchange amount and the second portion of the exchange amount, wherein the record is modified from associating only the first account with an entity and the exchange amount to a modified record associating the first account with the first portion of the exchange amount, an account of the one or more other accounts, the second portion of the exchange amount, and the entity;

perform, based on the record in the relational database, one or more actions to complete the event, wherein the one or more actions include at least one of:

performing, with the entity, a single exchange associated with the event based on the exchange amount; or receiving first resources associated with the first account based on the first portion of the exchange amount and second resources associated with the one or more other accounts based on the second portion of the exchange amount; and transmit, to the device associated with the entity and based on performing the one or more actions to complete the event, an indication that the transaction is approved.

2. The system of claim 1, wherein the one or more processors are further configured to:

transmit, to a device associated with a second account of the one or more other accounts, a second request to generate a one-to-many relationship with the event and the second account, wherein the second request indicates a third portion of the exchange amount to be associated with the second account and information associated with the event; and receive, from the device associated with the second account, approval to generate the one-to-many relationship, wherein the determination of whether the one-to-many relationship can be generated is based on receiving the approval to generate the one-to-many relationship.

3. The system of claim 1, wherein the one or more processors are further configured to:

determine, for a second account of the one or more other accounts, whether the second account is capable of accepting a third portion of the exchange amount, to be associated with the second account, indicated by the first request based on one or more attributes associated with the second account.

4. The system of claim 1, wherein the one or more processors are further configured to:

perform, based on receiving the first request and using a fraud model, a fraud analysis to determine a fraud score associated with the first request, wherein the determination of whether the one-to-many relationship can be generated is based on the fraud score.

5. The system of claim 1, wherein the one or more processors are further configured to:

determine that the one-to-many relationship can be generated for a second account, of the one or more other accounts, for a third portion of the second portion of the exchange amount; and determine that the one-to-many relationship cannot be generated for a third account, of the one or more other accounts, for a fourth portion of the second portion of the exchange amount, wherein the one or more processors, to modify the record, are configured to:

modify the record to generate the one to many relationship to link the event with the identifier of the first account and an identifier of the second account, wherein the record indicates that the second account is associated with the third portion of the exchange amount, and wherein the record indicates that the first account is associated with the first portion of the exchange amount and the fourth portion of the exchange amount.

6. The system of claim 1, wherein the one or more other accounts include a second account and a third account, and wherein the one or more processors, to modify the record, are configured to:

generate a first sub-record for the record associated with the first account and the first portion of the exchange amount indicated by the first request;

generate a second sub-record for the record associated with the second account and a third portion of the second portion of the exchange amount associated with the second account indicated by the first request; and generate a third sub-record for the record associated with the third account and a fourth portion of the second portion of the exchange amount associated with the third account indicated by the first request, wherein a sum of the first portion, the third portion, and the fourth portion is equal to the exchange amount.

7. The system of claim 1, wherein the one or more other accounts include a second account, and wherein the one or more processors, to perform the one or more actions to complete the event, are configured to:

reduce a balance or increase a limit associated with the first account by the second portion of the exchange amount, indicated by the first request, that is to be associated with the second account; and increase a balance or reduce a limit associated with the second account by the second portion of the exchange amount, indicated by the first request, that is to be associated with the second account.

8. The system of claim 1, wherein the one or more other accounts include a second account, and wherein the one or more processors, to perform the one or more actions to complete the event, are configured to:

identify that resources of the first account have been used to complete the event;

increase a balance or reduce a limit associated with the second account by the second portion of the exchange amount, indicated by the first request, that is to be associated with the second account; and provide a credit to a balance or a limit associated with the first account, wherein an amount of the credit is based on the second portion of the exchange amount that is to be associated with the second account.

9. A method for splitting an event between a first account and a second account by establishing a one-to-many relationship in a relational database, comprising:

receiving, by a server device and from a device associated with an entity, an indication of the event that is associated with the first account and the entity and an approval request to complete a transaction associated with the indication of the event, wherein the indication of the event indicates an exchange amount associated with the event, and wherein the device associated with the entity includes a transaction terminal configured to identify only a single account for the transaction;

establishing, by the server device in a relational database, a record to link an identifier associated with the first account with the identifier associated with the event;

receiving, by the server device and from a device associated with the first account, a first request to associate the event with the first account and the second account, wherein the first request indicates a first portion of the exchange amount to be associated with the first account and a second portion of the exchange amount to be associated with the second account;

modifying, by the server device and based on obtaining an approval indication that the first request is approved from the second account and in the relational database and based on a determination that the request is granted, the record to link the identifier associated with the event with the identifier associated with the first account and an identifier associated with the second account, wherein the record indicates that the first account is associated with the first portion of the exchange amount and indicates that the second account is associated with the second portion of the exchange amount, wherein modifying the record comprises modifying the record from associating only the first account with an entity and the exchange amount to a modified record associating the first account with the first portion of the exchange amount, the second account, the second portion of the exchange amount, and the entity;

updating, by the server device, a first balance associated with the first account to reduce the first balance based on modifying the record and a second balance associated with the second account to increase the second balance based on modifying the record;

performing, by the server device, an action to complete the event with the entity in a single exchange with the entity; and transmitting, by the server device and to the device associated with the entity and based on performing the one or more actions to complete the event, an indication that the transaction is approved.

10. The method of claim 9, further comprising:
transmitting, to a device associated with the second account, a second request to associate the event with the first account and the second account, wherein the second request indicates the second portion of the exchange amount to be associated with the second account and information associated with the event; and receiving, from the device associated with the second account, approval to generate the one-to-many relationship, wherein the determination of whether the one-to-many relationship can be generated is based on receiving the approval to generate the one-to-many relationship.

11. The method of claim 9, further comprising:
determining, for the second account, whether the second account is capable of accepting the second portion of the exchange amount to be associated with the second account based on one or more attributes associated with the second account.

12. The method of claim 9, further comprising:
performing, based on receiving the first request and using a fraud model, a fraud analysis to determine a fraud score associated with the first request, wherein the determination of whether the one-to-many relationship can be generated is based on the fraud score.

13. The method of claim 9, wherein the first request to associate the event with the first account and the second account indicates that the event is to be split between the first account, the second account, and a third account, the method further comprising:

determining that the request is granted for the second account for the second portion of the exchange amount; and determining that the request is not granted for the third account for a third portion of the exchange amount wherein modifying the record comprises:
modifying the record to link the event with the identifier of the first account and the identifier of the second account, wherein the record indicates that the second account is associated with the second portion of the exchange amount, and wherein the record indicates that the first account is associated with the first portion of the exchange amount, wherein an amount of the first portion includes an amount associated with the third portion of the exchange amount.

14. The method of claim 9, wherein the one or more other accounts include a second account and a third account, and wherein modifying the record comprises:

generating a first sub-record for the record associated with the first account and the first portion of the exchange amount indicated by the first request;

generating a second sub-record for the record associated with the second account and the second portion of the exchange amount associated with the second account indicated by the first request; and generating a third sub-record for the record associated with the third account and a third portion of the second portion of the exchange amount associated with the third account indicated by the first request, wherein a sum of the first portion, the second portion, and the third portion is equal to the exchange amount.

15. The method of claim 9, wherein updating the first balance and the second balance comprises:
identifying that resources of the first account have not been used to complete the event;

reducing the first balance associated with the first account, wherein an amount of that the first balance by which the first balance is reduced is based on the second portion of the exchange amount that is to be associated with the second account; and increasing the second balance associated with the second account by the second portion of the exchange amount associated with the second account.

16. A non-transitory computer-readable medium storing a set of instructions, the set of instructions comprising:

one or more instructions that, when executed by one or more processors of a device associated with a first account, cause the device to:

receive, via an input to a user interface of the device, an indication to split an event with a second account, wherein the indication to split the event includes a unique identifier associated with the second account and a portion of a first amount associated with the event to be associated with the second account, wherein the event is completed with an entity using a medium, the medium associated with the first account and an institution, and wherein the second account is associated with the institution, and wherein the medium is associated with a transaction terminal configured to identify only a single account for a transaction associated with the event;

transmit, to a server device associated with the institution, a request to split the event with the second account, wherein the request indicates the unique identifier associated with the second account and the portion of the first amount associated with the event to be associated with the second account;

receive, from the server device, an indication of whether the request to split the event with the second account is approved; and receive, from the server device, an indication of a balance associated with the account for display by the device, wherein the balance indicates:

a modified balance associated with the account based on a second amount of the portion of the first amount associated with the event to be associated with the second account if the request to split the event with the second account is approved, wherein a record is modified from associating only the first account with an entity and the first amount to a modified record associating the first account with the second account, the portion of the first amount associated with the event to be associated with the second account, and the entity, or an unmodified balance associated with the account if the request to split the event with the second account is not approved.

17. The non-transitory computer-readable medium of claim 16, wherein the server device generates a one-to-many relationship in a relational database linking an identifier of the first account and an identifier of the second account to an identifier associated with the event to enable the server device to split the first amount of the event among the first account and the second account.

18. The non-transitory computer-readable medium of claim 16, wherein the one or more instructions, when executed by the one or more processors, further cause the device to:

receive information associated with the event for display by the device, wherein the information associated with the event indicates that a total amount associated with the event is associated with the first account, wherein transmitting the request to split the event with the second account is based on the information to enable the server device associated with the institution to split the first amount of the event between the first account and the second account.

19. The non-transitory computer-readable medium of claim 16, wherein the one or more instructions, that cause the device to receive the indication to split the event with the second account, cause the device to:

receive the indication of the portion of the first amount associated with the event to be associated with the second account, wherein the portion is an amount or a percentage.

20. The non-transitory computer-readable medium of claim 16, wherein the one or more instructions, that cause the device to receive the indication to split the event with the second account, cause the device to:

receive the indication to split the event with the second account and a third account, and wherein the one or more instructions, that cause the device to receive the indication of whether the request to split the event is approved, cause the device to:

receive an indication that the request to split the event is approved for the second account and an indication that the request to split the event is not approved for the third account; and transmit, to the server device, an additional request to split the event, wherein the additional request indicates a different portion of the first amount to be associated with the second account.

* * * * *